Patented Oct. 5, 1954

2,691,023

UNITED STATES PATENT OFFICE 2,691,023

DIHYDROPYRROLO-(3.2-c) QUINOLINE DERIVATIVES

Hans Ulrich Hörlein, Hans Andersag, and Helmut Timmler, Wuppertal-Elberfeld, Germany, assignors to Schenley Industries, Inc., New York, N. Y., a corporation of Delaware No Drawing. Application April 28, 1953, Serial No. 351,751

Claims priority, application Germany May 26, 1952

24 Claims. (Cl. 260—288)

1

This invention relates generally to the synthesis of organic chemical compounds and, more particularly, it relates to certain novel derivatives of 4-methyl-2,3-dihydro - pyrrolo-(3,2-c) quinoline useful in chemotherapy, especially in treatment of malaria and amoebiasis.

The novel compounds of this invention are represented by the formula:

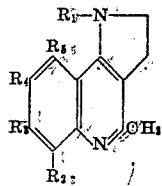

wherein $R_1$ is chosen from the group consisting of hydrogen, methyl, dimethylaminoethyl, diethylaminoethyl, and benzyl; and $R_2$, $R_3$, $R_4$ and $R_5$ are chosen from the group consisting of hydrogen and at most two members chosen from the group consisting of hydroxy, methoxy, ethoxy, N-methylcarbamyl and chlorine. The compounds of the foregoing formula wherein $R_1$ is β-diethylaminoethyl, $R_3$ is methoxy, and $R_2$, $R_4$ and $R_5$ are hydrogen, and wherein $R_1$ is diethylaminoethyl, $R_4$ is chloro, and $R_2$, $R_3$ and $R_5$ are hydrogen, have been found, by in vivo animal tests, to be the most effective amoebicides of the group of compounds of this invention.

The products of this invention may be obtained readily by reacting at elevated temperatures and, if desired, elevated pressures, ammonia or a primary amine with a suitable 3-β-haloethyl-4-halo-quinaldine according to the reaction represented in general terms as follows:

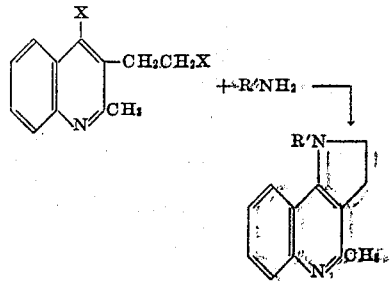

X = halogen.
R' = hydrogen, alkyl, arylalkyl, dialkylaminoalkyl.

2

It is preferred that the reaction be performed in a suitable normally liquid or low melting solid, semipolar organic solvent medium such as an alcohol or a phenol. Ammonia or low boiling point amines can be introduced into the hot reaction mixture while in the gaseous state, and higher boiling point amines may be added during or before the heating.

If ammonia is used as a primary reactant and derivatives substituted at the 1-position pyrrolo-nitrogen atom are desired, as the final products, the compounds which are unsubstituted at the pyrrolo-nitrogen atom can be converted into N-sodium, potassium, lithium or magnesium compounds by treatment with metallic sodium, potassium, or lithium, or a Grignard reagent. The N-metallo compounds can then be converted to the desired products by treatment with reactive esters, for instance, aliphatic halides, araliphatic halides, or hydroxy- or amino-substituted aliphatic alcohols.

In the following examples wherein the preparation of certain specific products of this invention is described, the primary reactants employed are: (1) ammonia or a primary amine, which may be a short-chain amino-alkane, such as methyl amine; an N,N-short-chain dialkyl-diamino-alkane, such as N,N-dimethyl-ethylenediamine or N,N-diethyl-ethylene-diamine; or a simple aralkylamine, such as benzylamine; and (2) a 3-β-chloroethyl-4-chloro-quinaldine, which may be devoid of bz-substituents or which may bear, as bz-substituents, one or more lower alkoxy radicals (e. g., methoxy, ethoxy); hydroxyl groups, or N-mono-lower-alkyl-carbamyl (e. g., N-methyl-carbamyl).

These quinaldine primary reactants may be prepared as follows: Aniline or a substituted aniline, selected to provide whatever bz-substituent group or groups that may be desired in the final product, is condensed with α-aceto-γ-butyrolactone to form a Schiff's base type compound represented by the general formula:

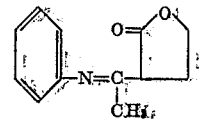

When these products are treated with phosphorus oxychloride, the products obtained are 3-β-chloroethyl-4-chloro-quinaldines which, if a substituted aniline is used in their preparation, will be substituted likewise in the bz-nucleus.

To facilitate a better understanding of this invention, the following examples are supplied—by way of illustration, merely, not by way of limitation upon the scope of the invention.

*Example 1*

Synthesis of the compound represented by the formula:

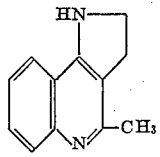

About 100 parts by weight of 3-β-chloroethyl-4-chloro-quinaldine are melted with 100 parts by weight of phenol and a stream of ammonia is passed into the melt, which is heated gradually to 155–160° C. The ensuing exothermic reaction causes the temperature to rise to about 180–200° C. When the reaction has slowed down, the mass is heated further at 160–170° C. for about one-half to one hour, cooled, then treated with 2-N sodium hydroxide solution and filtered under suction. The crude 4-methyl-2,3-dihydropyrrolo-(3.2-c)quinoline thus obtained as the filtration residue is dissolved in dilute acetic acid, reprecipitated by addition of aqueous sodium hydroxide solution, and recrystallized from a mixture of ethanol and petroleum ether or from pyridine. The thus-purified compound has a melting point higher than 270° C. and it is obtained in an amount of about 65% of the theoretical.

*Example 2*

Synthesis of the compound represented by the formula:

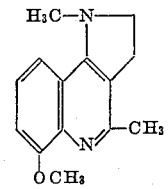

3-β-chloroethyl-4-chloro-8-methoxy - quinaldine (melting point, 151° C.) is reacted with methylamine in a melt of phenol in the manner described in Example 1. The resultant 1,4-dimethyl - 6 - methoxy-2,3-dihydropyrrolo-(3.2-c) quinoline is recovered as described in Example 1 and recrystallized from dilute methanol. It melts at 144° C. It can be distilled at 230° C. at a pressure of 0.3 millimeter of mercury. The yield amounts to 71% of the theoretical.

*Example 3*

Synthesis of the compound represented by the formula:

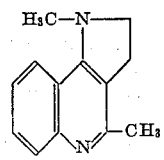

The procedure described in Example 2 is repeated with an equimolecular proportion of 3-β-chloroethyl-4-chloroquinaldine replacing the 3-β-chloroethyl-4-chloro - 8 - methoxy - quinaldine there employed. The product so obtained is 1,4-dimethyl-2,3-dihydropyrrolo - (3.2 - c)quinoline, melting at 108° C. and boiling at 190° C. under a pressure of 0.2 millimeter of mercury.

*Example 4*

Synthesis of the compound represented by the formula:

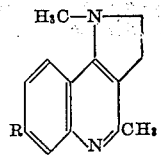

R = —OCH₃ or —OH.

The procedure described in Example 2 is repeated with an equimolecular proportion of 3-β-chloroethyl-4-chloro - 7 - methoxy-quinaldine (melting point, 102° C.) replacing the 3-β-chloroethyl-4-chloro-8-methoxy-quinaldine there employed. The product so obtained is 1,4-dimethyl-7-methoxy - 2,3 - dihydropyrrolo-(3.2-c)quinoline, melting at 142–143° C. and boiling at 220–230° C. at a pressure of 0.3 millimeter of mercury. 1,4-dimethyl-7-hydroxy-2,3-dihydropyrrolo - (3.2-c) - quinoline can be obtained by heating the 7-methoxy compound with hydrobromic acid (specific gravity, 1.5) and its hydrobromide salt melts higher than 300° C.

*Example 5*

Synthesis of the compound represented by the formula:

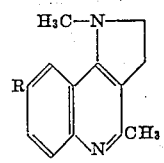

R=OCH₃ or —OH.

The procedure described in Example 2 is repeated with an equimolecular proportion of 3-β-chloroethyl-4-chloro - 6 - methoxy - quinaldine (melting point, 121° C.) replacing the 3-β-chloroethyl-4-chloro-8-methoxy-quinaldine there employed. The product so obtained is 1,4-dimethyl-8 - methoxy-2,3-dihydropyrrolo-(3.2-c)quinoline, melting at 82–83° C. and boiling at 220–230° C. at a pressure of 0.3 millimeter of mercury. 1,4-dimethyl-8-hydroxy-2,3-dihydropyrrolo - (3.2-c) - quinoline can be obtained by heating the 8-methoxy compound with hydrobromic acid (specific gravity, 1.5) and its hydrobromide salt melts higher than 300° C., after crystallizing from hot formamide.

*Example 6*

Synthesis of the compound represented by the formula:

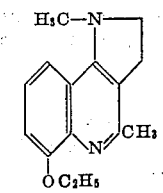

The procedure described in Example 2 is repeated with an equimolecular proportion of 3-β-chloroethyl-4-chloro - 8 - ethoxy-quinaldine (melting point, 119° C.) replacing the 3-β-chloroethyl-4-chloro-8-methoxy-quinaldine there employed. The product so obtained is 1,4-dimethyl-6-ethoxy-2,3-dihydropyrrolo-(3.2-c)quinoline, melting at 93–94° C. and boiling at 225–236° C. at a pressure of 0.2 millimeter of mercury.

Example 7

Synthesis of the compound represented by the formula:

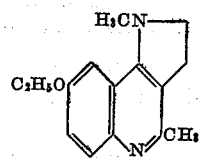

The procedure described in Example 2 is repeated with an equimolecular proportion of 3-β-chloroethyl - 4 - chloro - 6 - ethoxy-quinaldine (melting point, 118° C.) replacing the 3-β-chloro-ethyl-4-chloro-8-methoxy-quinaldine there employed. The product so obtained is 1,4-dimethyl-8-ethoxy-2,3-dihydro-pyrrolo-(3.2-c) quinoline, melting at 82° C. and boiling at 224–234° C. at a pressure of 0.2 millimeter of mercury.

Example 8

Synthesis of the compound represented by the formula:

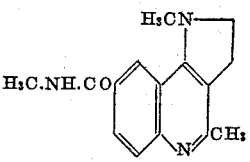

The procedure described in Example 2 is repeated with an equimolecular proportion of 3-β-chloroethyl - 4 - chloro - 6 - N - methylcarbamyl-quinaldine replacing the 3 - β - chloroethyl - 4 - chloro - 8 - methoxy - quinaldine there employed. The product so obtained is 1,4-dimethyl-8-N-methylcarbamyl - 2,3 - dihydropyrrolo - (3.2 - c) - quinoline, melting at 229–230° C.

Example 9

Synthesis of the compound represented by the formula:

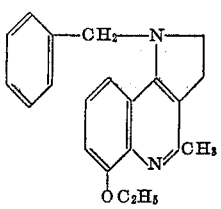

About 35 grams of 3-β-chloroethyl-4-chloro-8-ethoxy-quinaldine (melting point, 119° C.) are heated with 35 grams of phenol and 70 grams of benzylamine for three hours at 170–180° C. After cooling, the reaction mixture is introduced into 2-N sodium hydroxide solution and the phenol is dissolved. The undissolved, crude, 1-benzyl - 4 - methyl - 6 - ethoxy - 2,3 - dihydro-pyrrolo-(3.2-c) quinoline is filtered off under suction, dissolved in dilute acetic acid, and reprecipitated by addition of sodium hydroxide solution. After drying, it is extracted with ligroin in a Soxlet extractor, the ligroin distilled off, and the residue is dissolved in ethyl acetate. By adding maleic acid to the ethyl acetate solution, the maleate of 1-benzyl-4-methyl-6-ethoxy-2,3-dihydropyrrolo - (3.2 - c) quinoline is obtained, which melts at 177° C., after being recrystallized from a mixture of ethyl alcohol and ethyl acetate.

Example 10

Synthesis of the compound represented by the formula:

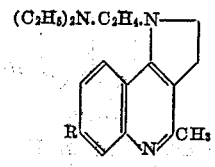

R = —OCH₃ or —H.

About 40 grams of 3-β-chloroethyl-4-chloro-7-methoxy-quinaldine (melting point, 102° C.), 40 grams of phenol and 70 grams of β-diethylamino-ethylamine are refluxed for three hours. The reaction product is dissolved in methylene chloride and the solution so obtained is extracted, first, with dilute sodium hydroxide solution, then with water, to remove the phenol. The methylene chloride solution is dried over solid potassium carbonate and distilled. The 1-β-diethylaminoethyl - 4 - methyl - 7 - methoxy - 2,3 - dihydropyrrolo-(3.2-c) quinoline distills over at 228–237° C. at a pressure of 0.1 millimeter of mercury. The distillate is taken up in acetone and the hydrochloride of 1-β-diethylaminoethyl-4-methyl-7 - methoxy - 2,3 - dihydropyrrolo - (3.2 - c) quinoline precipitated by hydrochloric acid. After recrystallization from a mixture of alcohol and ether, the purified product melts at 265° C. and is obtained in a yield of about 32% of the theoretical. Better yields are obtained if the excess of β-diethylamino-ethylamine is reduced. However, by boiling the reaction mixture for 15 hours, the methoxy group is partly attacked by hydrochloric acid, formed as a by-product during the reaction, and about equal parts of the methoxy compound and of 1 - β - diethylaminoethyl - 4-methyl - 7 - hydroxy - 2,3 - dihydropyrrolo-(3.2-c) quinoline are obtained. By reacting the mixture with hydrobromic acid (specific gravity, 1.5), the methyl group can be completely split off, giving essentially complete conversion of the 7-methoxy to the 7-hydroxy compound. The naphthalene - 1,5 - disulfonate of 7 - hydroxy - 4-methyl - 9 - 1 - β - diethylaminoethyl - 4-methyl - 7 - hydroxy - 2,3 - dihydropyrrolo-(3.2-c) quinoline melts higher than 285° C.

Example 11

Synthesis of the compound represented by the formula:

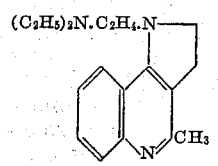

The procedure described in Example 10 is repeated with an equimolecular proportion of 3-β-chloroethyl - 4 - chloroquinaldine replacing the 3 - β - chloroethyl - 4 - chloro - 7 - methoxyquinaldine there employed. The product thus obtained is 1 - β - diethylaminoethyl - 4 - methyl-2,3-dihydropyrrolo-(3.2-c) quinoline of the boiling point 215–222° C. at a pressure of 0.1 millimeter of mercury. The melting point of the hydrochloride salt is over 300° C.

Example 12

Synthesis of the compound represented by the formula:

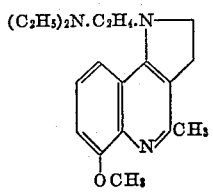

The procedure described in Example 10 is repeated with an equimolecular proportion of 3-β-chloroethyl - 4 - chloro - 8 - methoxy - quinaldine (melting point, 151° C.) replacing the 3-β-chloroethyl-4-chloro-7-methoxy-quinaldine there employed. The product so obtained is 1-β-diethylaminoethyl - 4 - methyl - 6 - methoxy - 2,3 - dihydropyrrolo-(3.2-c) quinoline of the boiling point 230–240° C. at a pressure of 0.2 millimeter of mercury, which yields a hydrochloride salt melting over 275° C.

Example 13

Synthesis of the compound represented by the formula:

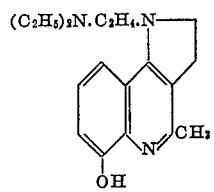

The procedure described in Example 10 is repeated with an equimolecular proportion of 3-β-chloroethyl - 4 - chloro - 8 - hydroxy - quinaldine (melting point, 180° C.) replacing the 3-β-chloroethyl-4-chloro-7-methoxy-quinaldine there employed. The product so obtained is 1-β-diethylaminoethyl - 4 - methyl - 6 - hydroxy - 2,3 - dihydropyrrolo-(3.2-c) quinoline, which yields a naphthalene-1,5-disulfonate salt melting at over 300° C.

Example 14

Synthesis of the compound represented by the formula:

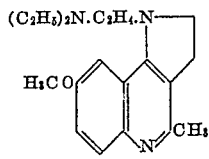

The procedure described in Example 10 is repeated with 3-β-chloroethyl-4-chloro-6-methoxy-quinaldine (melting point, 121° C.) replacing the 3 - β - chloroethyl - 4 - chloro - 7 - methoxy quinaldine there employed. The product so obtained is 1 - β - diethylamino - 4 - methyl - 8 - methoxy - 2,3 - dihydropyrrolo - (3.2 - c) quinoline, which yields a maleate salt that melts at 155° C.

Example 15

Synthesis of the compound represented by the formula:

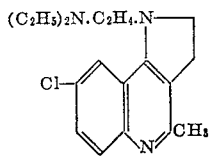

The procedure described in Example 10 is repeated with 3-β-chloroethyl-4,6-dichloro-quinaldine (melting point 117° C.) replacing the 3-β-chloroethyl - 4 - chloro - 7 - methoxy - quinaldine there employed. The product so obtained is 1-β-diethylaminoethyl - 4 - methyl - 8 - chloro - 2,3 - dihydropyrrolo-(3.2-c) quinoline, which yields a hydrochloride salt melting at above 300° C.

Example 16

Synthesis of the compound represented by the formula:

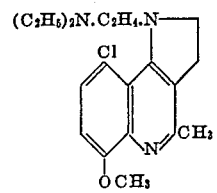

The procedure described in Example 10 is repeated with 3 - β - chloroethyl - 4,5 - dichloro - 8-methoxy-quinaldine replacing the 3-β-chloroethyl-4-chloro-7-methoxy-quinaldine there employed. The product so obtained is 1-β-diethylaminoethyl - 4 - methyl - 6 - methoxy - 9 - chloro - 2,3 - dihydropyrrolo - (3.2 - c) quinoline, which, after being recrystallized from ligroin, melts at 108–109° C.

Example 17

Synthesis of the compound represented by the formula:

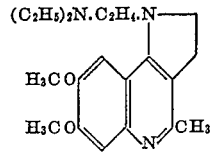

The procedure described in Example 10 is repeated with 3 - β - chloroethyl - 4 - chloro - 6,7 - dimethoxy-quinaldine replacing the 3-β-chloroethyl-4-chloro-7-methoxy-quinaldine there employed. The product so obtained is 1-β-diethylaminoethyl - 4 - methyl - 7,8 - dimethoxy - 2,3 - dihydropyrrolo-(3.2-c) quinoline, which yields a naphthalene-1,5-disulfonic acid salt melting at above 300° C.

Example 18

Synthesis of the compound represented by the formula:

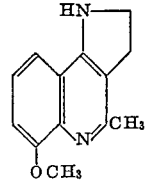

About 50 grams of 3-β-chloroethyl-4-chloro-8-methoxy-quinaldine are melted with 50 grams of phenol and ammonia is introduced into the melt at 150–180° C. After one hour, the mixture is cooled and stirred with dilute sodium hydroxide solution. The insoluble residue comprising crude 4 - methyl - 6 - methoxy - 2,3 - dihydropyrrolo - (3.2-c) quinoline is dissolved in dilute acetic acid and reprecipitated by addition of dilute sodium hydroxide solution. The product is removed, stirred with alcohol, then the alcohol is removed by suction filtration and the residue is dried. The crude compound so obtained can be subjected to basic alkylation or may be purified in substantially the same manner as the products obtained as described in the foregoing examples.

*Example 19*

Synthesis of the compound represented by the formula:

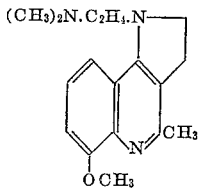

About 16 grams of crude 4-methyl-6-methoxy-2,3-dihydropyrrolo-(3.2-c)quinoline, which may be obtained as described in Example 18, are boiled for 2 hours in 150 cubic centimeters of dried xylene with 5 grams of sodamide moistened with toluene. Thereupon, a solution of 10 grams of β-dimethylaminoethyl chloride in xylene is added, drop by drop, and the mixture is allowed to boil for another two hours. After cooling, the precipitate is removed by filtration under suction, washed with xylene, and the xylene filtrate and washings are shaken several times with aqueous dilute acetic acid. Crude 1-β-dimethylaminoethyl - 4 - methyl - 6 - methoxy - 2,3 - dihydropyrrolo-(3.2-c)quinoline can be recovered from the acetic acid solution by precipitation following addition of sodium hydroxide solution. The precipitate is removed by vacuum filtration, washed with water, and dried. The dried substance is dissolved in acetone and precipitated as the naphthalene-1,5-disulfonate salt from the acetone solution. The salt, after being washed with methanol and recrystallized from water, melts at 300° C., and the yield amounts to 47% of the theoretical.

Attention is directed to our copending United States applications Serial Nos. 351,752 and 351,753, also filed on April 28, 1953, wherein we have described and claimed other dihydropyrrolo-(3.2-c)quinoline derivatives and processes for their production.

Having thus described the subject matter of this invention, what it is desired to secure by Letters Patent is:

1. As a new chemical compound, a substance chosen from the group consisting of compounds represented by the formula:

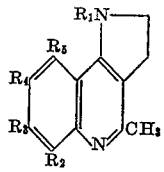

wherein $R_1$ is chosen from the group consisting of hydrogen, methyl, dimethylaminoethyl, diethylaminoethyl, and benzyl; and $R_2$, $R_3$, $R_4$ and $R_5$ are chosen from the group consisting of hydrogen and at most two members chosen from the group consisting of hydroxy, methoxy, ethoxy, N-methylcarbamyl and chlorine.

2. As a new chemical compound, 4-methyl-2,3-dihydropyrrolo-(3.2-c)quinoline.

3. As a new chemical compound, 4-methyl-6-methoxy-2,3-dihydropyrrolo-(3.2-c)quinoline.

4. As a new chemical compound, 1,4-dimethyl-2,3-dihydropyrrolo-(3.2-c)quinoline.

5. As a new chemical compound, 1,4-dimethyl-7-hydroxy-2,3-dihydropyrrolo-(3.2-c)quinoline.

6. As a new chemical compound, 1,4-dimethyl-8-hydroxy-2,3-dihydropyrrolo-(3.2-c)quinoline.

7. As a new chemical compound, 1,4-dimethyl-6-methoxy-2,3-dihydropyrrolo-(3.2-c)quinoline.

8. As a new chemical compound, 1,4-dimethyl-7-methoxy-2,3-dihydropyrrolo-(3.2-c)quinoline.

9. As a new chemical compound, 1,4-dimethyl-8-methoxy-2,3-dihydropyrrolo-(3.2-c)quinoline.

10. As a new chemical compound, 1,4-dimethyl-6-ethoxy-2,3-dihydropyrrolo-(3.2-c)quinoline.

11. As a new chemical compound, 1,4-dimethyl-8-ethoxy-2,3-dihydropyrrolo-(3.2-c)quinoline.

12. As a new chemical compound, 1,4-dimethyl-8 - N - methylcarbamyl - 2,3 - dihydropyrrolo - (3.2-c)quinoline.

13. As a new chemical compound, 1-β-dimethylaminoethyl - 4 -methyl - 6 - methoxy - 2,3 - dihydropyrrolo-(3.2-c)quinoline.

14. As a new chemical compound, 1-β-diethylaminoethyl - 4 - methyl - 2,3 - dihydropyrrolo - (3.2-c)quinoline.

15. As a new chemical compound, 1-β-diethylaminoethyl - 4 - methyl - 6 - hydroxy - 2,3 - dihydropyrrolo-(3.2-c)quinoline.

16. As a new chemical compound, 1-β-diethylaminoethyl - 4 - methyl - 7 - hydroxy - 2,3 - dihydropyrrolo-(3.2-c)quinoline.

17. As a new chemical compound, 1-β-diethylaminoethyl - 4 - methyl - 6 - methoxy - 2,3 - dihydropyrrolo-(3.2-c)quinoline.

18. As a new chemical compound, 1-β-diethylaminoethyl - 4 -methyl - 7 -methoxy - 2,3 - dihydropyrrolo-(3.2-c)quinoline.

19. As a new chemical compound, 1-β-diethylamino - 4 - methyl - 8 - methoxy - 2,3 - dihydropyrrolo-(3.2-c)quinoline.

20. As a new chemical compound, 1-β-diethylaminoethyl - 4 - methyl - 7,8 - dimethoxy - 2,3 - dihydropyrrolo-(3.2-c)quinoline.

21. As a new chemical compound, 1-β-diethylaminoethyl - 4 - methyl - 6 - methoxy - 9 - chloro-2,3-dihydropyrrolo-(3.2-c)quinoline.

22. As a new chemical compound, 1-β-diethylaminoethyl - 4 - methyl - 8 - chloro - 2,3 - dihydropyrrolo-(3.2-c)quinoline.

23. As a new chemical compound, 1-benzyl-4-methyl - 6 - ethoxy - 2,3 - dihydropyrrolo - (3.2-c)quinoline.

24. Process for the synthesis of 4-methyl-2,3-dihydropyrrolo-(3.2-c)quinoline compounds that comprises reacting, at an elevated temperature and in a suitable semi-polar organic solvent medium chosen from the group consisting of alcohols and phenols, a substance chosen from the group consisting of ammonia and primary amines, with a 3-β-halo-ethyl-4-halo-quinaldine, and recovering the desired reaction product from the reaction mixture.

References Cited in the file of this patent
UNITED STATES PATENTS

| Number | Name | Date |
|---|---|---|
| 2,196,776 | McNally et al. | Apr. 9, 1940 |
| 2,650,229 | Timmler et al. | Aug. 25, 1953 |